Patented June 26, 1934

1,964,429

UNITED STATES PATENT OFFICE 1,964,429

METHOD OF CLEANING FRUITS AND VEGETABLES

Edward C. Eberts, Jeffersonville, Ind.

No Drawing. Application May 12, 1931, Serial No. 536,948

9 Claims. (Cl. 146—219)

This invention relates to a new and improved process of cleaning natural and acquired undesirable materials from the surfaces of vegetables of various kinds as well as any other materials adapted to be cleaned in the manner to be described and the invention is particularly adapted to the cleaning of peas and beans and any other podded plants.

Referring particularly to peas and beans as treated by this process applicant calls attention to certain characteristics of natural growth in plants of this nature that have a very great bearing on the facility of properly cleansing these food products and that also have a very great bearing on the flavors finally sealed in the can as offered to the consuming public.

The insides of the pods of plants of this nature are provided with a mucilaginous substance or membrane, which together with the juices released from the pods and vines during the threshing operations, seems to more or less envelop the individual peas and beans and thus coat them with a somewhat sticky exterior to which dust and other dirt and undesirable matter adhere during their preparation for canning.

The usual methods now employed for cleansing the material is a rinsing in water, either heated or cold which removes such material that is not closely adhering, but it is not until the product reaches the blanching step that the most of this undesirable material is removed, and even here, it is not fully removed but enough is carried along with the product to effect the natural flavor of the product or to discolor more or less the liquor in which the product is immersed when it is finally sealed in the can. The excessive heat usually required in the blancher to remove as much of this mucilaginous matter and adhering dirt as possible has a more or less deleterious effect on the final flavor of the product, since this heat causes the product to be more absorptive and thereby it acquires unnatural flavors that heretofore have not been possible to avoid. This is due more or less to the pollution of the blancher water which gradually becomes loaded with the mucilaginous matter and other dirt and debris and the hot and expanded product cannot help but absorb more or less of this undesirable material. An examination of the blancher overflow will disclose that the liquid is slimy and milky due to the materials removed from the surfaces of the product and the absorption of this slimy and milky substance is what degrades the flavor and quality.

Applicant wishes to mention here that the process of this application is also well adapted to the cleansing of fruits of various kinds for removing surface dirt and especially for removing the spray residue on apples, pears and other like fruits which may be treated in substantially the same manner as will be described for the vegetables, so that this further description may apply to the fruits as well as to the vegetables although the fruits may not be specifically mentioned.

My discovery consists in placing a quantity of small sponges or a like material that is more or less absorptive and which will have a light scrubbing action on the product which has the effect of most effectively removing the surface accumulations from the individual peas or beans or of apples and such. The quantity of sponges required compared to the quantity of product present has been found to be substantially about double that of the product, but this proportion may vary within quite wide limits according to operating conditions and the particular material being cleansed. The sponges are preferably about the size of hens' eggs when treating the smaller sized products, but may be as large as desired for larger sized products, the point being to provide a sufficient quantity of the sponges or other material suitable for the purpose, to give the desired degree of cleansing within the operative space available.

The operation of cleansing fruits or vegetables by this process is continuous, in that a constant stream of vegetables or fruit is moved through an ordinary rotary washer consisting of a comparatively long cylinder with perforated wall, or imperforate if desired, the bottom of which is immersed and rotates in a bath of water or other suitable cleansing fluid. Fresh and clean sponges are fed to the inlet of the cylinder and immediately mix with the material and quickly absorb moisture and as the sponges are rolled around with the peas, beans or fruit they produce a very effective scrubbing action to the surfaces, and the slight abrasion imparted thereto has the effect of removing substantially all of the mucilaginous matter and adhering dirt in the case of the vegetables and the spray residue or other matter in the case of fruits.

When the mixture of sponges and cleansed material reach the exit end of the cylinder the material may be separated from the sponges by passing the mass over a proper screen which will permit the cleansed material to fall through the reticulations and pass on to the other apparatus in the canning line, while the dirty sponges tail over the end of the cylinder and drop into a washer where they are thoroughly rinsed and are then passed through a power wringer and the moisture squeezed out when they are ready for further use.

When the sponges drop from the wringer they fall into a blast of air provided by a suitable blower and are blown around over the top of the cylinder up to the head end where they fall into the oncoming material and repeat their cleansing operation during the ensuing trip through the cylinder. The supply of sponges are thus used repeatedly, are rinsed after each trip through the cylinder, the water squeezed out and returned to the head end of the cylinder for another trip with a new batch of material, thus producing a continuous cycle of operation wherein the same sponges are used continuously to treat a continuous stream of new material.

It is therefore an object of this invention to provide a new and improved method of cleansing fruits and vegetables of accumulated débris from their outer surfaces.

It is also an object to provide a method of cleansing fruits and vegetables wherein an absorptive cleansing means is intermixed with the fruits or vegetables in the presence of a liquid and the mass agitated to produce a scrubbing action to cleanse the material.

It is also an object of the invention to provide a method of cleansing fruits and vegetables wherein a continuous stream of fruit or vegetables are passed through a predetermined path and an absorptive scouring means are intermixed therewith through a portion of said path to cleanse and scour the said material.

It is a further object of the invention to provide a method of cleansing fruits and vegetables wherein a continuous stream of fruits or vegetables are passed through a predetermined path in the presence of a liquid, a scouring and cleansing means and having absorptive properties, are intermixed therewith for contacting with said fruits or vegetables and removing by a light abrasive action the undesirable surface accumulations, the said cleansing means being separated from the cleansed material, rinsed and the moisture removed and returned to the beginning of the path for reuse.

It is also an object of the invention to provide a method of cleansing fruits and vegetables wherein a continuous stream of fruits or vegetables are moved through a cleansing bath of suitable liquid, are agitated so that all parts of the surfaces of the material is coated with the liquid, placing a quantity of small sponges in the liquid with the material to be cleansed whereby the agitation of the mass will produce a scouring action on the surfaces of the material to cleanse the same, separating the sponges from the cleansed material, cleansing the sponges and returning them to the beginning of the cycle for further use.

It is also an object of the invention to provide a method of cleansing fruit or vegetables or any other material adapted to treatment in the manner described wherein a stream of material is passed through a cleansing zone, units of slightly abrasive or cleansing material of larger individual size than the fruits, vegetables or other material being handled, are mixed with the mass and the whole agitated to produce an abrasive action, the cleansing units being then separated from the mass, are themselves cleansed and returned for reuse.

In the foregoing description I have referred to the material being treated as being passed through a bath of cleansing liquid, which may or may not be just water, and that the cleansing takes place in the presence of a liquid, I do not mean to convey by this that it is always necessary or desirable to immerse the material and the sponges or other abrasive units in a liquid bath, or that the cylinder or other conveying and agitating means need be immersed in a liquid.

In treating vegetables or fruits by this method it is desirable that a liquid be present, and more or less in contact with the material and the sponges, and in the usual processes of preparing the material for treatment it is washed in either warm or cold water to remove easily removable substances and in passing from the washing step to the cleansing step in contact with the sponges there is enough moisture adhering to the individual particles of the mass of material to supply the desired moisture.

This moisture carried along by the material in many circumstances and conditions of operation, is all that is needed to effect the desired cleansing of the material, and particularly in the case of peas and lima beans and such it is sufficient to permit of a perfect cleansing and removal of foreign and undesirable matter adhering to the product. In treating lima beans the sponges actually reach down into the eye of the bean and remove dirt and refuse that has never before been removed in commercial practice, and leave a cleanliness and appearance that is far better than ever before attained.

The passage of the material through the cleansing zone with the sponges and only the moisture carried by the mass of material from the washing step is sufficient for the sponges to absorb practically all of the adhering moisture as they also absorb the dirt and mucilaginous material loosened by the rubbing action due to the agitation, so that as the peas or beans pass from this treatment to the conveying belt or other transferring device, under, possibly a blast of air the very last bit of moisture is dried off so that the subsequent operations of treating the product is carried on with a thoroughly cleaned and dried product which renders possible the application of further treatments that could not be utilized before with the product wet.

It is also possible to use the process in comparatively a dry condition of operation. For example, some fruits and vegetables that would require only a polishing of the skins to give them the desired cleanliness and appearance would be applicable to treatment by this process, and where the cleansing material is of a softer nature than the product being cleansed or polished there would be the minimum of abrasion to damage the tender skins of fruits or vegetables, and further the cleansing material being in units of size larger than the material being treated also lends advantages that are not present in treatments using a comminuted material.

The foregoing seems to fully describe the method and manner of carrying it out and the preferred objects of the invention, and while I have described the method as applied to a preferred apparatus it is of course to be understood that it is fully applicable to other and different apparatus, for example, an agitating cylinder might be inclined with one end dipping into a cleansing or treating liquid and the other end be out of contact with the liquid, so that a combination of effect would be had. The manner of bringing the fruits and vegetables into contact with the liquid and sponges or other material may be changed quite materially from the described operations and still fall within the scope and meaning of the invention, and I wish it understood therefore, that any change from the described manner of applying the method will be merely an adaptation of the invention to suit other operating conditions and such changes will be considered as falling within the scope of the claims hereto appended.

Having described my invention what I claim as new and desire to secure by Letters Patent is:

1. The method of cleaning granular material such as peas or beans consisting in moving a stream of granular material through a liquid bath, mixing sponges with the material, agitating the mixed mass to effect a scrubbing action, separating the sponges from the cleaned material, cleaning the sponges and returning them to the stream of material for reuse.

2. The method of cleaning granular material such as peas and beans consisting in moving a stream of material through a liquid, mixing sponges with the material, agitating the mass, separating the sponges, rinsing the sponges, squeezing the liquid from the sponges and returning them to be again mixed with material for further cleaning action thereon.

3. The method of cleaning a granular material such as peas and beans consisting in moving a stream of material through a liquid, mixing a plurality of absorbent cleaning units with said material, agitating the mass to effect a scouring action, passing the mass over a separating means to remove the cleaning units from the granular material, cleansing the cleaning units, compressing them to remove moisture therefrom and then again mixing them with the stream of granular material for further use.

4. The method of cleansing granular material such as peas and beans consisting in moving a stream of continuously fresh material through a liquid, moving an endless stream of cleaning units through a circuitous path, intermingling said material and cleaning units for a part of their travel to produce a scrubbing effect, diverting the path of the cleaning units to separate them from the granular material, removing moisture and débris from the cleaning units during a part of their travel thus preparing them for continuous use.

5. The method of cleaning peas, beans and like materials to remove natural and acquired surface débris consisting in mixing a quantity of small sponges with the peas or beans, agitating the mass in the presence of a liquid to effect a scouring action, the sponges acting to absorb the débris and carry it, separating the sponges from the peas, squeezing the débris therefrom and mixing the sponges with a new batch of peas for further cleaning action.

6. The method of cleaning vegetables or fruit to remove surface accumulations consisting in taking a quantity of vegetables or fruit, placing them in a cleansing liquid, placing about double the quantity of small sponges with the fruit or vegetables, agitating the mass to produce a rubbing action, removing the sponges from the liquid, removing the débris carried thereby to render the sponges capable of reuse.

7. The method of cleaning a granular material such as peas, beans or a fruit consisting in moving a stream of material through a predetermined path, moving a stream of cleaning units through a predetermined path, each individual cleaning unit being larger in size than any of the units of material to thereby form interstices between the cleaning units through which the material may percolate and intermingling said cleaning units and said material during a part of their travel to effect the cleaning of the material through the abrasive action incident to its percolating through said cleaning units, then while continuing the movement of both the material and the cleaning units separating the material from the cleaning units and cleansing the cleaning units for reuse.

8. The method of cleaning material such as peas, beans, fruit or the like consisting in moving a stream of material through a predetermined path, moving a stream of elastic cleaning units through a predetermined path, each cleaning unit being larger in size than any material unit, intermingling and mixing the material and the cleaning units for a portion of their travel to produce a rubbing action therebetween, separating the material from the cleaning units without stopping their movement and applying pressure to the cleaning units to remove accumulated débris and then returning the cleaning units for reuse.

9. A method of treating and cleaning peas, beans and other product consisting in moving a continuous stream of product through a substantially horizontal path, moving a mass of porous yieldable treating units through an endless path and bringing the path of products and the path of treating units into coincidence for a part of their travel and mixing the product with the treating units, the individual size of the pieces of said treating units being greater than the individual size of the pieces of product, agitating the mixed mass so the product will percolate through the interstices between the treating units and then separating the product from the units by moving it in a lateral direction therefrom.

EDWARD C. EBERTS.